United States Patent

Sakashita et al.

Patent Number: 6,018,608
Date of Patent: Jan. 25, 2000

[54] METHOD OF GENERATING INFORMATION USED FOR THE COPY PROTECTING SIGNAL AND APPARATUS USING THE SAME

[75] Inventors: Hirohiko Sakashita, Nara; Hisao Morita, Hirakata; Masaaki Fujita, Takatsuki; Kenji Ishikawa, Hirakata, all of Japan

[73] Assignee: Matsushita Electric Industrial Co., Ltd., Osaka, Japan

[21] Appl. No.: 08/761,532

[22] Filed: Dec. 6, 1996

[30] Foreign Application Priority Data

Dec. 7, 1995 [JP] Japan .................................. 7-318773

[51] Int. Cl.[7] ...................................................... H04N 5/76
[52] U.S. Cl. ...................................... 386/1; 386/94; 380/5
[58] Field of Search .......................... 386/1, 94; 360/60; 380/5, 7, 22; H04N 5/76, 5/92

[56] References Cited

U.S. PATENT DOCUMENTS 4,577,216  3/1986  Ryan .
5,243,411  9/1993  Shirochi et al. .......................... 360/60
5,657,387  8/1997  Mogi et al. ................................. 380/5
5,907,655  5/1999  Oguru ......................................... 380/5
5,943,468  8/1999  Takayama .................................. 386/94

Primary Examiner—Thai Tran
Attorney, Agent, or Firm—Ratner & Prestia

[57] ABSTRACT

A component of color difference signal is detected from a video component signal, and its color saturation information is compared with a predetermined threshold level, then in response to the comparison result, information is generated in order to control phase modulation such as, when the information is smaller than the threshold level, phases of color burst signals are modulated during a specified period, and when the information is larger than the threshold level, the phase stays as standard. The generated information is added to the color video signal. These steps can avoid unpleasant striped color noises appeared on a conventional color TV receiver, the unpleasant striped color noises has been caused by a modified color burst signal without the above steps.

12 Claims, 2 Drawing Sheets

METHOD OF GENERATING INFORMATION USED FOR THE COPY PROTECTING SIGNAL AND APPARATUS USING THE SAME

BACKGROUND OF THE INVENTION

The present invention relates to a method and an apparatus processing a color video signal, and more precisely, a method and an apparatus for generating information for copy protection with regard to a video tape recorder (VTR) or a video cassette recorder (VCR) with which a video program is copied.

Recently, quite a few methods have been proposed and carried out for protecting or prohibiting a VTR or VCR from copying a video program on a video tape.

For example, U.S. Pat. No. 4,577,216 teaches the following method:

Modify a color television (TV) signal so that the modified signal reproduces a normal picture when a conventional TV receiver receives the modified signal; however, when the modified signal is recorded in a video tape and playbacked, color noises emerge to turn the color picture unpleasant, whereby restraining anyone from copying a video program on a video tape not any more.

The above method is detailed as follows:

Modify a color burst signal for color video signal through phase modulation with noises or an appropriate signals. In the conventional color TV receiver, the modified signal does not influence the regeneration circuit of color subcarrier although the burst signal is phase-modulated. However, when a video tape including the modified signal is playbacked in a VTR or VCR, the VTR or VCR responds the phase-modulated color burst signal and changes the phase of chrominance signal, as a result, unpleasant color noises emerge in pictures when the video tape is playbacked and thus it is expected that anyone is restrained from copying a video program not any more.

Yet, in actual, the phase-modulated color burst signal sometimes influences the regeneration circuit for color subcarrier of the conventional color TV receiver. When a video with a high degree of color saturation is displayed in particular, unpleasant striped color noises sometimes appear in the screen.

Properly speaking, the copy protecting method should be effective only to the playback function of a VTR or VCR, and should not influence the conventional color TV receiver. Thus the above phenomenon is a problem to be solved.

SUMMARY OF THE INVENTION

It is an object of the present invention to provide an improved method and apparatus when modifying a color video signal in order to protect or prohibit copying a video program on a video tape. To be more specific, the object is to provide an improved method and apparatus which do not produce a color noise when the modified signal is directly received by the conventional color TV receiver, and yet when the modified video signal is recorded and playbacked, the video becomes unpleasant due to the color noise. This is because of improving the prior art, that is to modify a color video signal by phase modulating a color burst signal of the color video signal and use the modified signal as a copy protecting signal. The improvement on that prior art is detailed below:

When using the prior art mentioned above, the conventional color TV receiver is likely to produce striped color noises particularly in a color video with a high color saturation degree. The present invention, thus first, detects the information about color video of each scene, and second, generates the information about an instruction whether phase modulation is applied to a color burst signal in order to be a copy protecting signal or not, based on the detected information. For example, compare an amplitude of a color difference signal with a predetermined threshold level, and when the amplitude is larger than the threshold level, give information of flag bit 0 to the color video signal. When the amplitude is not larger than the threshold level, give information of flag bit 1 to the color video signal.

If the color video signal carries such information, on the stage of converting a component signal to a composite signal, leave a color burst signal at a reference phase when the color video signal carries flag bit 0. When the color burst signal carries flag bit 1, the color-burst-phase can be modulated upon necessity. The improved copy protecting signal is thus obtained.

As a result, when the conventional color TV receiver receives the color video signal including the copy protecting signal processed according to the present invention, color video scene free from color noises is seen because the color-burst-phase is not modulated, while color noises would appear in the same scene if the prior art is used.

DESCRIPTION OF THE PREFERRED EMBODIMENTS

Figure 1:
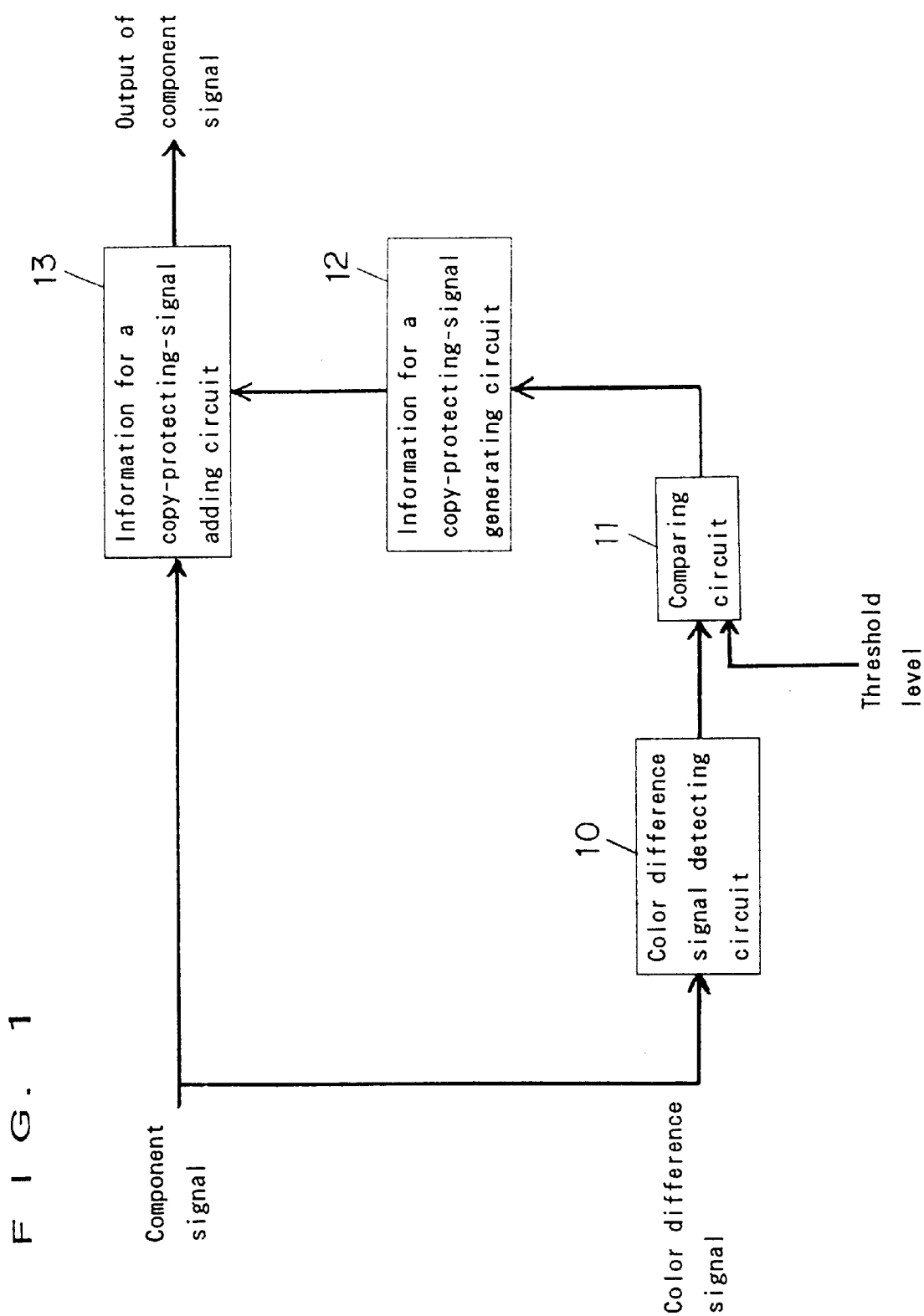
FIG. 1 is a block diagram of an exemplary circuit according to the present invention.

In the exemplary embodiment shown in FIG. 1, the color video signal coded from a component is fed to a circuit 13 of adding information for a copy protecting signal as well as to a color-difference-signal-detecting-circuit 10. The color-difference-signal-detecting-circuit 10 detects a component of color difference signal, and feeds the information about a degree of color saturation to an input terminal of a comparing circuit 11.

The comparing circuit 11 compares a magnitude of amplitude of the color difference signal with a predetermined threshold level fed to another input terminal, and outputs the result to a circuit 12 of generating information for the copy protecting signal.

The circuit 12 of generating information for the copy protecting signal generates information for the copy protecting signal responding to a comparison result. Now, compare an amplitude of a color difference signal in each field of every scene with a threshold, e.g. 50% of the maximum specified amplitude. In response to the comparison result, when the amplitude is not more than the threshold, namely 50% of the maximum specified amplitude, the information for the copy protecting signal is generated upon necessity so that the color burst of at least several dozens of scanning lines per field can be phase-modulated.

Output of the circuit 12 of generating information for the copy protecting signal is fed to the circuit 13 of adding information for the copy protecting signal, where the information for the copy protecting signal is added to the color video signal already inputted there. The information for the copy protecting signal added to a color video component signal is thus finally used for controlling the phase modulation of the color burst signal on the stage of converting the component signal to the composite signal.

Figure 2:
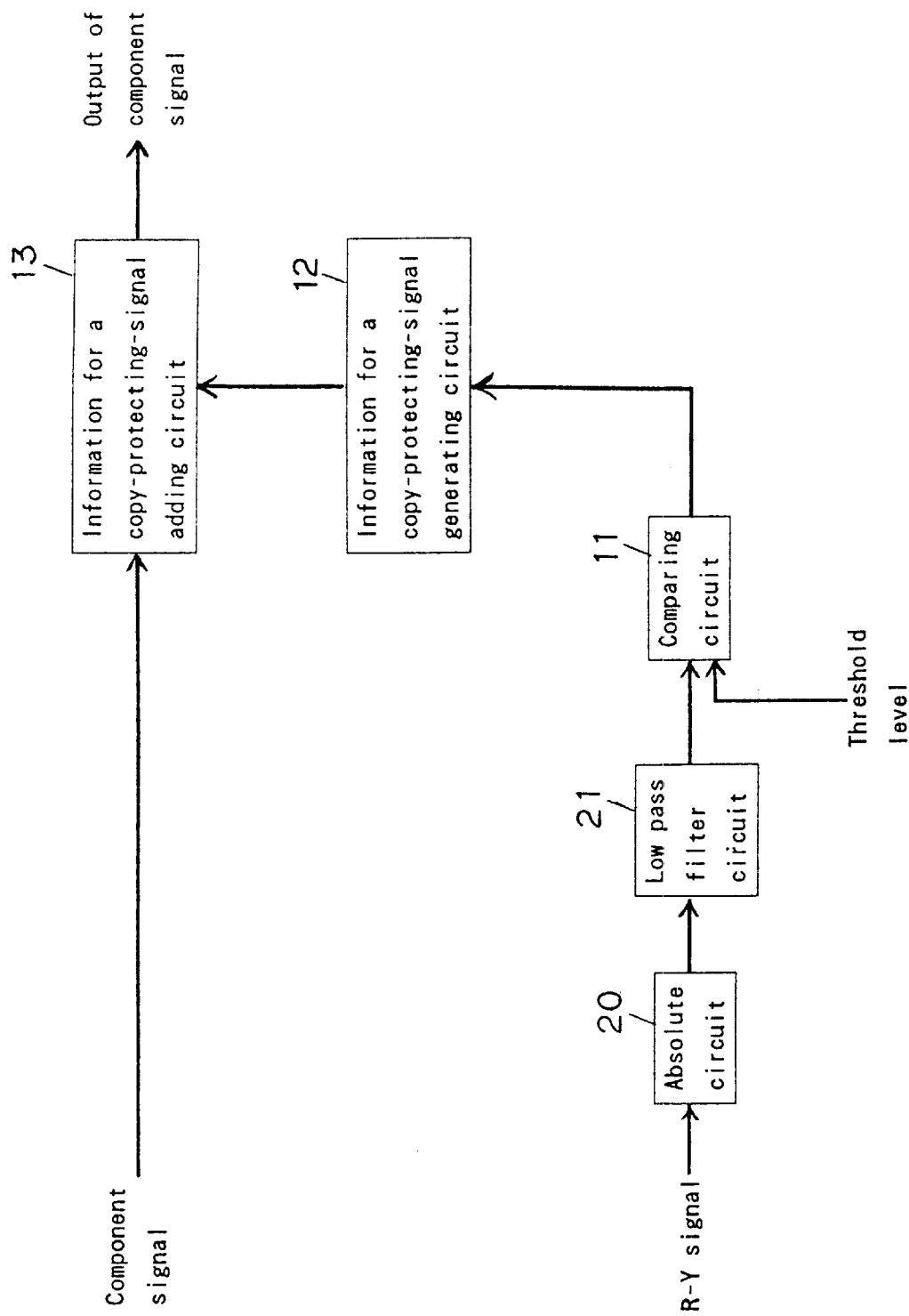
FIG. 2 is a block diagram of another exemplary circuit according to the present invention.

FIG. 2 is a block diagram of another exemplary circuit according to the present invention. In FIG. 2, a color video signal coded from component video signal is fed to the circuit 13 of adding information for the copy protecting signal. On the other hand, a (R-Y) signal of color difference from the color video signal is fed to an absolute circuit 20, where an absolute value of the amplitude of (R-Y) signal is taken out and outputted to a low pass filter circuit 21. The low pass filter 21 removes a high band signal components included in the absolute value signal of (R-Y) signal, and feeds only a component of a baseband signal to an input terminal of the comparing circuit 11.

The comparing circuit 11 compares the amplitude of the signal outputted at the low pass filter circuit 21 with a predetermined threshold value, and outputs the comparison result to the circuit 12 of generating information for the copy protecting signal.

The circuit 12 of generating information for the copy protecting signal generates the information for the copy protecting signal in response to the comparison result same as the case explained in FIG. 1. The signal of the information generated is fed to the circuit 13 of adding information for the copy protecting signal, and added to the color video signal before being outputted. This is the same way explained in FIG. 1.

As explained above, according to the present invention, color information is detected from each scene, in particular, in the scene which is likely to influence a color TV receiver, phase modulation to a burst signal is avoided in order not to modify the burst signal, and in a scene which does not influence the color TV receiver, phase modulation is applied to the burst signal to modify it. Information is generated to control such an operation as above. As a result, the copy protecting signal is obtained without affecting the picture quality of the conventional color TV receiver. The present invention thus overcomes the problem of the prior art explained in background of the invention.

In the preferred embodiment using FIG. 2, the magnitude of (R-Y) signal amplitude of color difference component is compared with the threshold level; however, not to mention, (B-Y) signal, I signal or Q signal may replace the (R-Y) signal. Further, a composite signal of (R-Y) signal+(B-Y) signal may replace the (R-Y) signal as an object of comparison.

In both the embodiments using FIG. 1 and FIG. 2, 50% of the maximum specified amplitude is exemplified as a threshold level; however, the threshold level is not limited to 50% of the maximum specified amplitude, but other figures than 50% may be used.

In the embodiments using FIG. 1 and FIG. 2, the coded signal from component color video signal is used; however, it is also possible to convert or process a composite signal in order to get a color difference signal, and process it. Further, not only a digital signal but also an analog signal is used.

In the above embodiments, the generated information controls to phase-modulate the burst signals of at least several dozens of scanning lines; however, it is also possible to generate information which controls phasemodulation on each scanning line and add the information to the color video signal.

The present invention is not limited to the above preferred embodiments, but various modifications can be made within the scope of the invention as defined in the appended claims.

What is claimed is:

1. A method of generating information for a copy protecting signal used in modifying a color video signal in order to protect copying a video program, said method comprising the steps of:
   (1) comparing information about color difference signal detected from said color video signal with a predetermined threshold level,
   (2) generating information for a copy protecting signal in response to a comparison result gained from Step (1),
   (3) adding said information for a copy protecting signal to said color video signal in a specified format.

2. The method of claim 1, wherein said information about color difference signal described in step (1) is embodied as (R-Y) signal, and the (R-Y) signal is compared with the predetermined threshold level.

3. The method of claim 1, wherein said information about color difference signal described in step (1) is embodied as (B-Y) signal, and the (B-Y) signal is compared with the predetermined threshold level.

4. The method of claim 1, wherein said information about color difference signal described in step (1) is embodied as a composite signal of (R-Y) signal+(B-Y) signal, and said composite signal is compared with the predetermined threshold level.

5. The method of claim 1, wherein I signal is compared with the predetermined threshold level in step (1).

6. The method of claim 1, wherein Q signal is compared with the predetermined threshold level in step (1).

7. The method of claim 1, wherein a composite signal of I signal+Q signal is compared with the predetermined threshold level.

8. The method of claim 1, wherein said information about color difference signal described in step (1) is embodied as an absolute value of the color difference signal, and a signal passed through a low pass filter is compared with the predetermined threshold value.

9. The method of claim 1, wherein a comparison result gained in step (1) tells that said information about color difference signal is smaller than said threshold level, then in step (2), information for the copy protecting signal is generated in order to modulate a phase of a composite-color-video-signal during a predetermined period.

10. The method of claim 9, wherein said predetermined period corresponds to at least several dozens of scanning lines per field.

11. An apparatus of generating information for a copy protecting signal used in modifying a color video signal in order to protect copying a video program, said apparatus comprising:
   (1) a detecting circuit means for detecting information about color difference signal from an inputted color video signal,
   (2) a comparing circuit means for comparing color-difference-signal-information tapped from said color-difference-signal-information detecting circuit means fed to an input terminal with a predetermined threshold level fed to another input terminal,
   (3) a generating circuit means for generating specified information for a copy protecting signal in response to a comparison result of said color-difference-signal-information with said threshold level, said circuit means being connected to said comparing circuit means, and (4) an adding circuit means for adding said information for a copy protecting signal to said inputted color video signal in a specified format, said adding circuit means being connected to an output terminal of said generating circuit means.

12. An apparatus of claim 11, wherein said detecting circuit means includes means which produces an absolute value of a color difference signal detected from said inputted color video signal, and then passes said absolute value through a low pass filter circuit to be a desired color-difference-signal-information.

* * * * *